T. JACOBS.
PORTABLE SCALE TESTER.
APPLICATION FILED NOV. 7, 1911.

1,070,477.

Patented Aug. 19, 1913.

WITNESSES
G. M. Spring.
J. P. Kelly

INVENTOR
Thomas Jacobs
Richard Oliver
his Attorney

UNITED STATES PATENT OFFICE.

THOMAS JACOBS, OF SOUTH ROCKWOOD, MICHIGAN.

PORTABLE SCALE-TESTER.

1,070,477.  Specification of Letters Patent.  Patented Aug. 19, 1913.

Application filed November 7, 1911. Serial No. 659,034.

*To all whom it may concern:*

Be it known that I, THOMAS JACOBS, a citizen of the United States, residing at South Rockwood, in the county of Monroe and State of Michigan, have invented new and useful Improvements in Portable Scale-Testers, of which the following is a specification.

My invention relates to scale testing means.

An object of my invention is to provide means whereby a scale may be tested, said means being simple in construction and simple and easy to manufacture.

Another object of my invention is to provide a scale testing means which is inexpensive to manufacture.

A further object of my invention is to provide a scale testing means, the parts of said means adapted to be dismembered and of such construction that they may be easily inserted into a suitcase or valise of ordinary construction in such a manner that the same may be carried from place to place with little difficulty.

With the foregoing and other objects in view, my invention relates to such details of construction and in the arrangement and combination of parts as will be hereinafter fully described and specifically pointed out in the appended claims.

Figure 1:
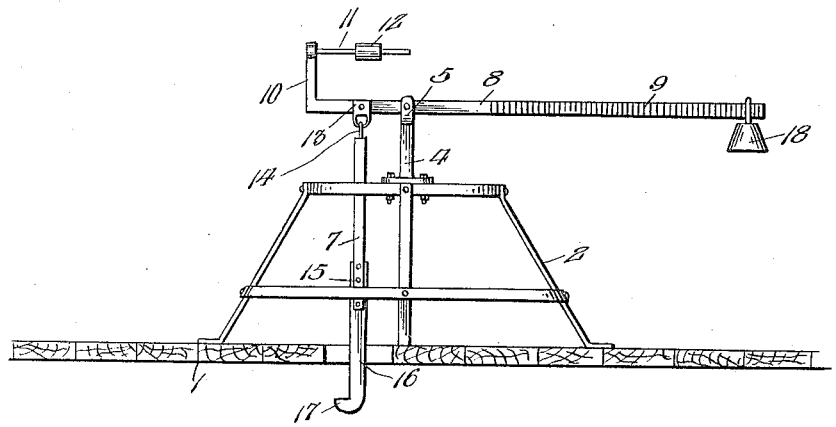
Figure 2:
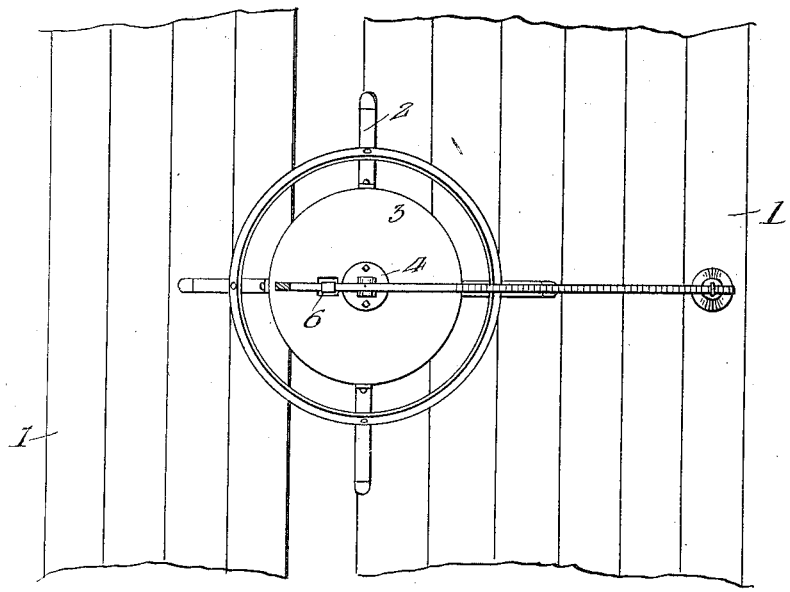

In describing my invention in detail reference will be had to the accompanying drawings wherein like characters denote like or corresponding parts throughout the several views and in which, Figure 1 is a side elevation of my improved scale testing means, the same being shown disposed upon a scale platform. Fig. 2 is a top plan view of the same.

In the accompanying drawings which fully illustrate the preferred type of my invention 1 designates a scale platform of any simple construction. I desire it to be understood that I do not limit myself to any specific scale which my attachment is to be used in connection with and that my attachment can be used with equal results upon any ordinary scale.

2 designates the body portion of my scale testing means, said body portion 2 adapted to be connected to the scale platform 1 by any suitable means, I not limiting myself to any specific form whatever. The body portion 2 is provided with an annular shaped platform 3 upon which is secured the bracket 4. The bracket 4 is provided with the bifurcated end 5 which serves a purpose that will be hereinafter fully described. The bracket 4 may be secured to the annular platform 3 by any suitable means. The annular platform 3 is provided with an opening 6 through which extends the rod 7, said rod 7 serving a purpose that will be hereinafter fully described.

Pivoted upon the bifurcated end 5 of the bracket 4 is the scale beam 8 which has the graduation points 9 formed thereon. The scale beam 8 is further provided with an extension 10 extending upwardly and supporting the rod 11 upon which rod 11 is slidable a weight 12 which serves a purpose which will be described. I provide the scale beam 8 further with a bracket 13 to which is secured the adjacent end of the rod 7 by such means as is shown at 14. Connected to the lower end of the rod 7 by means such as shown in 15, is the member 16 which has the offset portion 17 formed thereon.

Slidable upon the scale beam 8 is a weight 18 which serves a purpose that is obvious.

It will be readily seen in the operation of my device that when the same is secured to a scale platform as shown in Fig. 1 and the member 16 extends through the scale platform 1, the offset portion 17 engaging the scale beam of the scale to be tested, the movement of the scale beam to be tested will actuate the scale beam 8 of my invention whereby the movement of the scale beam being tested, will be pointed out by the position of the weight 18 upon the beam 8. The weight of my invention, the same being very light however, tends to move the scale platform downwardly when the same is disposed thereon whereby I have provided the weight 12 which can be adjusted upon the rod 11 to account for this arrangement of the scales in question.

I desire it to be understood that I may make slight changes in the construction without departing from the spirit of my invention, provided such changes fall within the scope of the subjoined claims.

Having thus fully described my invention, what I claim as new and desire to secure by Letters Patent is:—

1. A scale testing device including a body portion adapted to be arranged over an opening within a scale platform, a vertically extending bracket carried by the said body, the said bracket terminating at its upper extremity in a bifurcated end, a scale beam pivotally supported within the said bifurcation of the bracket, a weight adjustably mounted upon said scale beam, an adjustable bracket carried by the said beam, a rod pivotally connected to the said adjustable bracket and depending therefrom, and means including a depending hook shaped member secured to the said rod, the said member adapted to be secured to the beam of the scales to be tested.

2. In a portable scale testing device, the combination of a body portion adapted to be arranged over an opening within a scale platform, a vertically extending bracket carried by the said body, the said bracket terminating at its upper extremity in a bifurcated end, a scale beam pivotally supported within the said bifurcation of the bracket, a weight member adjustably mounted upon the said scale beam from one side of its pivotal connection, an adjustable bracket carried by the said beam upon the opposite side of the pivotal connection, a rod pivotally connected to the said adjustable bracket, and depending therefrom, and means including a substantially hook shaped member secured to the lower extremity of the said depending rod, the said member adapted to extend within the opening of the scale platform and be connected to the beam of the scales to be tested.

THOMAS JACOBS.

Witnesses:
  GEORGE STRONG,
  DANIEL A. KNAGGS.

---

Copies of this patent may be obtained for five cents each, by addressing the "Commissioner of Patents, Washington, D. C."